(12) United States Patent
Sugiura (10) Patent No.: US 7,377,333 B1
(45) Date of Patent: May 27, 2008

(54) LINEAR POSITION SENSOR FOR DOWNHOLE TOOLS AND METHOD OF USE

(75) Inventor: Junichi Sugiura, Houston, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 0 days.

(21) Appl. No.: 11/714,966

(22) Filed: Mar. 7, 2007

(51) Int. Cl.
*E21B 47/02* (2006.01)

(52) U.S. Cl. .......................... 175/45; 175/73; 324/346; 324/207.21; 166/66.5

(58) Field of Classification Search .................. 175/73, 175/45; 166/66, 66.5, 61, 73, 76
See application file for complete search history.

(56) References Cited

U.S. PATENT DOCUMENTS

| | | | |
|---|---|---|---|
| 2,373,880 | A | 4/1945 | Driscoll |
| 2,603,163 | A | 7/1952 | Nixon |
| 2,874,783 | A | 2/1959 | Haines |
| 2,880,805 | A | 4/1959 | Nelson et al. |
| 2,915,011 | A | 12/1959 | Hamill |
| 3,968,473 | A | 7/1976 | Patton et al. |
| 4,407,374 | A | 10/1983 | Wallussek et al. |
| 4,416,339 | A | 11/1983 | Baker et al. |
| 4,463,814 | A | 8/1984 | Horstmeyer et al. |
| 4,715,440 | A | 12/1987 | Boxell et al. |
| 4,715,451 | A | 12/1987 | Bseisu et al. |
| 4,773,263 | A | 9/1988 | Lesage et al. |
| 4,844,178 | A | 7/1989 | Cendre et al. |
| 4,947,944 | A | 8/1990 | Coltman et al. |
| 4,957,173 | A | 9/1990 | Kinnan |
| 4,958,125 | A | 9/1990 | Jardine et al. |
| 5,070,950 | A | 12/1991 | Cendre et al. |
| 5,168,941 | A | 12/1992 | Krueger et al. |
| 5,226,332 | A | 7/1993 | Wassell |

(Continued)

FOREIGN PATENT DOCUMENTS

EP  1174582 A3  1/2002

(Continued)

OTHER PUBLICATIONS

Chen, D.C.-K, Comeaux, B., Gillespie, G., Irvine, G., and Wiecek, B., "Real-Time Downhole Torsional Vibration Monitor For Improving Tool Performance and Bit Design," IADC/SPE Drilling Conference, Feb. 21-23, 2006, Miami, Florida, SPE99193.

(Continued)

*Primary Examiner*—David J. Bagnell
*Assistant Examiner*—Sean D Andrish (57) ABSTRACT

Aspects of this invention include a downhole tool having first and second members disposed to translate substantially linearly with respect to one another. A magnet is deployed on the first member and a plurality of magnetic field sensors is deployed on the second member. The magnetic field sensors are spaced in a direction substantially parallel with a direction of translation between the first and second members. The tool typically further includes a controller disposed to determine a linear position of the first and second members with respect to one another from magnetic flux measurements made at the magnetic field sensors. Exemplary position sensor embodiments of the present invention are non-contact and therefore are not typically subject to mechanical wear. Embodiments of the invention therefore tend to advantageously provide for accurate and reliable linear position measurements.

40 Claims, 7 Drawing Sheets

U.S. PATENT DOCUMENTS

| | | | |
|---|---|---|---|
| 5,313,829 A | 5/1994 | Paslay et al. | |
| 5,355,950 A | 10/1994 | Zwart | |
| 5,448,911 A | 9/1995 | Mason | |
| 5,603,386 A | 2/1997 | Webster | |
| 5,629,480 A | 5/1997 | Herget | |
| 5,721,376 A | 2/1998 | Pavone et al. | |
| 5,797,453 A | 8/1998 | Hisaw | |
| 5,864,058 A | 1/1999 | Chen | |
| 5,941,323 A | 8/1999 | Warren | |
| 6,065,332 A | 5/2000 | Dominick | |
| 6,068,394 A | 5/2000 | Dublin, Jr. | |
| 6,092,610 A | 7/2000 | Kosmala et al. | |
| 6,148,933 A | 11/2000 | Hay et al. | |
| 6,158,529 A | 12/2000 | Dorel | |
| 6,173,793 B1 * | 1/2001 | Thompson et al. | 175/45 |
| 6,206,108 B1 * | 3/2001 | MacDonald et al. | 175/24 |
| 6,216,802 B1 | 4/2001 | Sawyer | |
| 6,267,185 B1 | 7/2001 | Mougel et al. | |
| 6,268,726 B1 | 7/2001 | Prammer et al. | |
| 6,290,003 B1 | 9/2001 | Russell | |
| 6,427,783 B2 | 8/2002 | Krueger et al. | |
| 6,518,756 B1 | 2/2003 | Morys et al. | |
| 6,608,565 B1 | 8/2003 | Van Steenwyk et al. | |
| 6,609,579 B2 | 8/2003 | Krueger et al. | |
| 6,647,637 B2 | 11/2003 | Lechen | |
| 6,681,633 B2 | 1/2004 | Schultz et al. | |
| 6,702,010 B2 | 3/2004 | Yuratich et al. | |
| 6,742,604 B2 | 6/2004 | Brazil et al. | |
| 6,761,232 B2 | 7/2004 | Moody et al. | |
| 6,848,189 B2 | 2/2005 | Moake et al. | |
| 7,219,748 B2 * | 5/2007 | Gao et al. | 175/45 |
| 2002/0124652 A1 | 9/2002 | Schultz et al. | |
| 2003/0184305 A1 | 10/2003 | Niina | |
| 2004/0140809 A1 * | 7/2004 | Mercer | 324/326 |
| 2004/0163809 A1 * | 8/2004 | Mayeu et al. | 166/255.1 |
| 2004/0206170 A1 | 10/2004 | Chen et al. | |
| 2004/0222019 A1 | 11/2004 | Estes et al. | |
| 2004/0238166 A1 * | 12/2004 | Salamitou et al. | 166/255.1 |
| 2004/0239313 A1 | 12/2004 | Godkin | |
| 2004/0251898 A1 | 12/2004 | Morys et al. | |
| 2005/0001737 A1 | 1/2005 | Baron et al. | |
| 2005/0034985 A1 | 2/2005 | Zamanzadeh et al. | |
| 2005/0150694 A1 | 7/2005 | Schuh | |
| 2005/0189938 A1 | 9/2005 | Schley et al. | |
| 2006/0131013 A1 * | 6/2006 | McElhinney | 166/250.01 |
| 2006/0185902 A1 | 8/2006 | Song et al. | |

FOREIGN PATENT DOCUMENTS

| | | |
|---|---|---|
| WO | WO-01-51761 A1 | 7/2001 |
| WO | WO-03-097989 A1 | 11/2003 |

OTHER PUBLICATIONS

Panasonic Hybrid IC brochure No. ENQ39, dated Mar. 2005.

* cited by examiner

LINEAR POSITION SENSOR FOR DOWNHOLE TOOLS AND METHOD OF USE

RELATED APPLICATIONS

None.

FIELD OF THE INVENTION

The present invention relates generally to downhole tools, for example, including directional drilling tools having one or more steering blades. More particularly, embodiments of this invention relate to a sensor apparatus and a method for determining the linear position of various components, such as steering blades and/or hydraulic pistons used in downhole tools.

BACKGROUND OF THE INVENTION

Position sensing tools have several important applications in downhole tools used in subterranean drilling. For example, many drilling applications require directional drilling tools to control the lateral drilling direction. Such steering tools commonly include a plurality of force application members (also referred to herein as blades) that may be independently extended out from and retracted into a housing. The blades are disposed to extend outward from the housing into contact with the borehole wall and to thereby displace the housing from the centerline of a borehole during drilling. Blade position sensors are useful for determining blade extension. Accurate blade position measurements facilitate more accurate steering of the drill bit. Additionally, such blades are typically controlled by a hydraulic circuit. The measurement of a piston position within a hydraulic reservoir may be utilized, for example, to calculate the volume of pressurized hydraulic fluid available to actuate the blades.

Various position and displacement sensors are known in the downhole arts for measuring the position of pistons, blades, and other movable components on downhole tools (e.g., including wireline tools, logging-while-drilling tools, measurement-while-drilling tools, and steering tools). Such sensors typically make use of analog sensing devices such as potentiometers, pressure transducers, or ultrasonic transducers. For example, Webster, in U.S. Pat. No. 5,603,386 discloses a downhole steering tool in which each blade is fitted with a sensor (such as a potentiometer) for measuring the borehole size and the displacement of the blade.

While prior art sensors are known to be serviceable, such as for measuring blade and/or piston position, they are also known to suffer from various drawbacks. For example, potentiometers are known to be susceptible to mechanical wear and temperature drift due to the analog sensing and outputting mechanism utilized. Pressure transducers are known to be inaccurate for position sensing applications (particularly in demanding downhole environments), and the installation of such sensors tends to be complicated and expensive, e.g., requiring o-rings and/or other seals. The above-described drawbacks of prior art sensor arrangements often result in unreliable and inaccurate position data and also tend to increase the fabrication and maintenance expense of downhole tools.

Therefore, there exists a need for an improved sensor apparatus and method for accurately determining a position and/or distance of various downhole tool components. In particular, there exists a need for improved downhole tool position sensor deployments, e.g., including wireline, logging-while-drilling (LWD), measurement-while-drilling (MWD), and steering tool deployments.

SUMMARY OF THE INVENTION

The present invention addresses one or more of the above-described drawbacks of prior art tools and methods. One exemplary aspect of this invention includes a downhole tool having a sensor arrangement for measuring the position of a blade or a hydraulic piston. In one exemplary embodiment, a rotary steerable tool in accordance with this invention includes a substantially linear array of magnetic sensors deployed along an outer surface of a hydraulic housing, and a magnet assembly fixed to the piston whose position is to be measured. The position of the magnet (and therefore the piston) may be measured, for example, by determining the location within the magnetic sensor array that experiences a peak magnetic field induced by the magnet assembly. In one embodiment, magnetic sensor measurements may be advantageously transmitted to a microprocessor that is programmed to apply a curve-fitting program to the sensor data. The position of the magnet assembly may then be calculated, for example, by determining the maxima/minima of an equation that characterizes the magnetic field strength data gathered from the magnetic sensors.

Exemplary embodiments of the present invention may advantageously provide several technical advantages. For example, sensor embodiments in accordance with the present invention are non-contact and therefore not typically subject to mechanical wear. Moreover, embodiments of this invention tend to provide for accurate and reliable measurements with very little drift despite the high temperatures and pressures commonly encountered by downhole tools. Additionally, embodiments of the invention are typically small, low mass, and low cost and tend to require minimal maintenance.

In one aspect the present invention includes a downhole tool. The downhole tool includes a downhole tool body and first and second members disposed to translate substantially linearly with respect to one another. A magnet is deployed on the first member and a plurality of magnetic field sensors is deployed on the second member. The magnetic field sensors are spaced in a direction substantially parallel with a direction of translation between the first and second members. The downhole tool further includes a controller disposed to determine a linear position of the first and second members with respect to one another from magnetic flux measurements at the magnetic field sensors.

In another aspect this invention includes a downhole steering tool configured to operate in a borehole. The steering tool includes at least one blade deployed in a housing and a position sensor disposed to measure the position of the blade relative to the housing. The blade is configured to displace between radially opposed retracted and extended positions in the housing. The position sensor includes a magnet assembly deployed on either the blade or the housing and a linear array of magnetic field sensors deployed on either the blade or the housing such that the linear array is substantially parallel with a direction of extension and retraction of the blade. The magnet assembly and linear array are disposed to translate with respect to one another as the blade is retracted and extended in the housing. At least one of the magnetic field sensors is in sensory range of magnetic flux emanating from the magnet assembly.

In still another aspect this invention includes a downhole tool. The downhole tool includes a downhole tool body and a hydraulic fluid chamber deployed in the tool body. The hydraulic fluid chamber includes a piston deployed therein and is disposed to provide pressurized hydraulic fluid to at least one hydraulically actuated tool member. The downhole tool further includes a position sensor disposed to measure a position of the piston in the chamber. The position sensor includes a magnet assembly deployed on the piston and a linear array of magnetic field sensors deployed on the tool body such that the linear array is substantially parallel with a direction of motion of the piston in the chamber. At least one of the magnetic field sensors is in sensory range of magnetic flux emanating from the magnet assembly.

The foregoing has outlined rather broadly the features of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other methods, structures, and encoding schemes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Referring first to FIGS. 1 to 6, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 to 6 may be described herein with respect to that reference numeral shown on other views.

Figure 1:
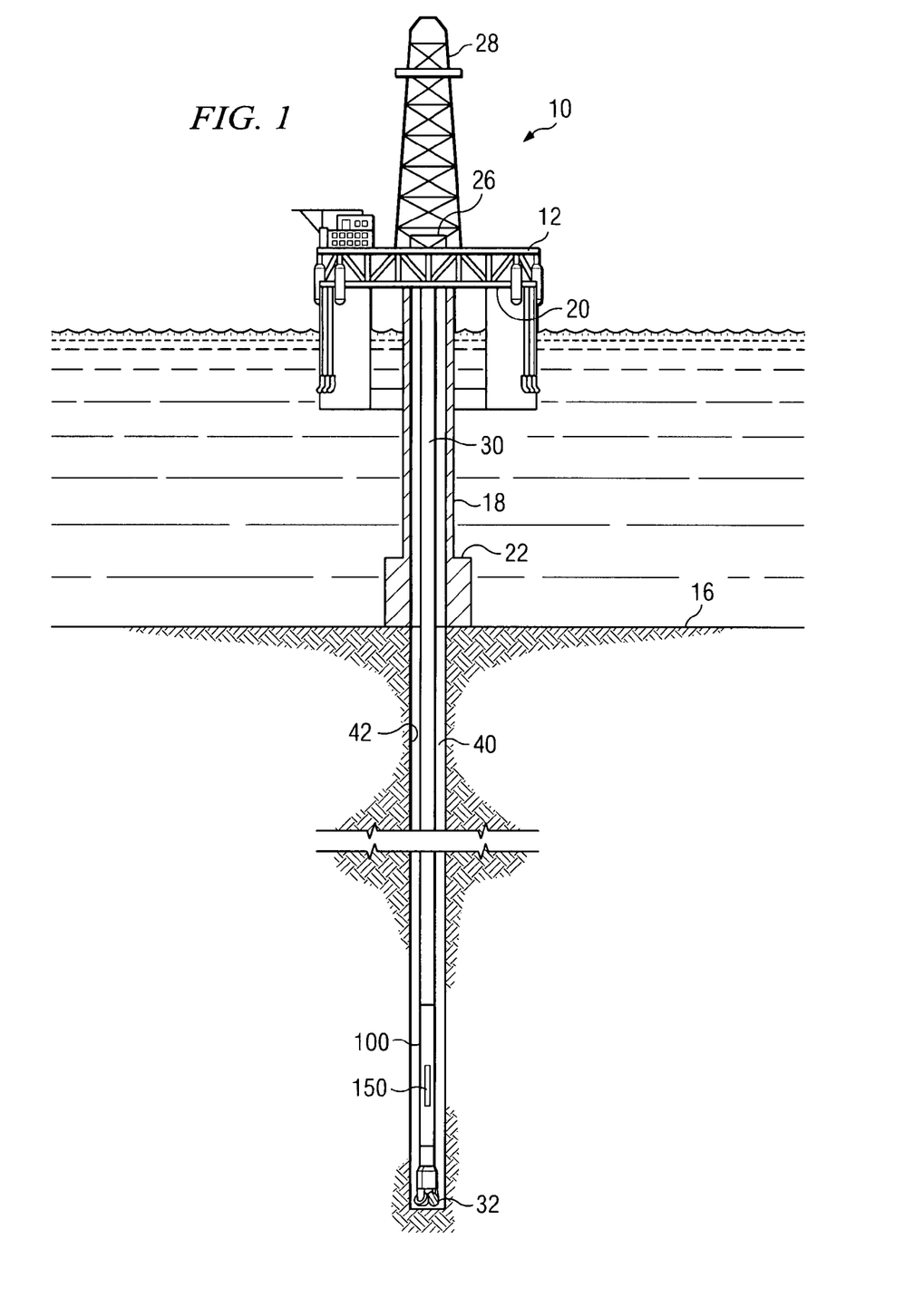
FIG. 1 depicts a drilling rig on which exemplary embodiments of the present invention may be deployed.

FIG. 1 illustrates a drilling rig 10 suitable for utilizing exemplary downhole tool and method embodiments of the present invention. In the exemplary embodiment shown on FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and a directional drilling tool 100 (such as a three-dimensional rotary steerable tool). In the exemplary embodiment shown, steering tool 100 includes one or more, usually three, blades 150 disposed to extend outward from the tool 100 and apply a lateral force and/or displacement to the borehole wall 42. The extension of the blades deflects the drill string 30 from the central axis of the borehole 40, thereby changing the drilling direction. Drill string 30 may further include a downhole drilling motor, a mud pulse telemetry system, and one or more additional sensors, such as LWD and/or MWD tools for sensing downhole characteristics of the borehole and the surrounding formation. The invention is not limited in these regards.

It will be understood by those of ordinary skill in the art that methods and apparatuses in accordance with this invention are not limited to use with a semisubmersible platform 12 as illustrated in FIG. 1. This invention is equally well suited for use with any kind of subterranean drilling operation, either offshore or onshore. Moreover, while the invention is described with respect to exemplary three-dimensional rotary steerable (3DRS) tool embodiments, it will also be understood that the present invention is not limited in this regard. The invention is equally well suited for use in substantially any downhole tool requiring linear position measurement.

Figure 2:
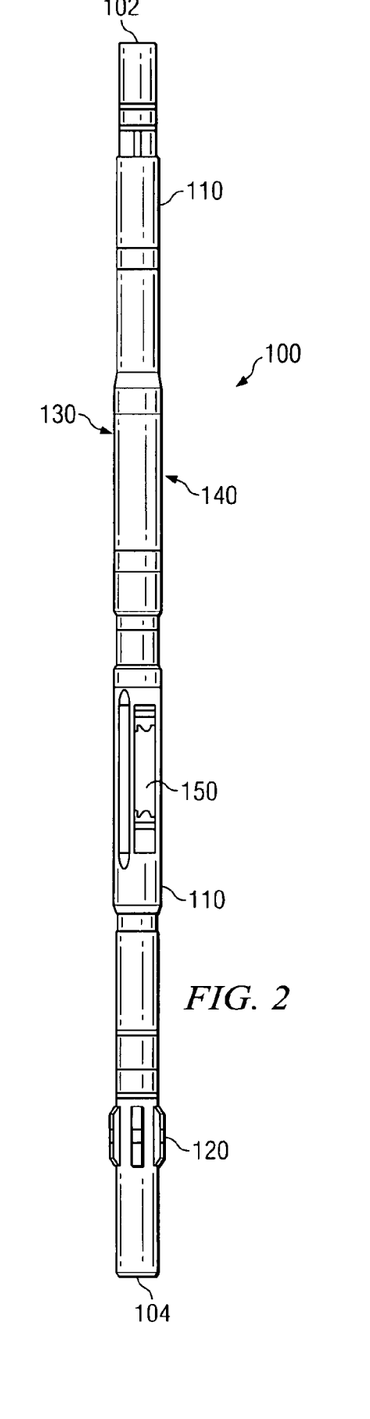
FIG. 2 is a perspective view of the steering tool shown in FIG. 1.

Turning now to FIG. 2, one exemplary embodiment of rotary steerable tool 100 from FIG. 1 is illustrated in perspective view. In the exemplary embodiment shown, rotary steerable tool 100 is substantially cylindrical and includes threaded ends 102 and 104 (threads not shown) for connecting with other bottom hole assembly (BHA) components (e.g., connecting with the drill bit at end 104). The rotary steerable tool 100 further includes a housing 110 deployed about a shaft (not shown in FIG. 2). The shaft is typically configured to rotate relative to the housing 110. The housing 110 further includes at least one blade 150 deployed, for example, in a recess (not shown) therein. Directional drilling tool 100 further includes hydraulics 130 and electronics 140 modules (also referred to herein as control modules 130 and 140) deployed in the housing 110. In general, the control modules 130 and 140 are configured for sensing and controlling the relative positions of the blades 150.

To steer (i.e., change the direction of drilling), one or more of blades 150 are extended and exert a force against the borehole wall. The rotary steerable tool 100 is moved away from the center of the borehole by this operation, thereby altering the drilling path. In general, increasing the offset (i.e., increasing the distance between the tool axis and the borehole axis via extending one or more of the blades) tends to increase the curvature (dogleg severity) of the borehole upon subsequent drilling. The tool 100 may also be moved back towards the borehole axis if it is already eccentered. It will be understood that the drilling direction (whether straight or curved) is determined by the positions of the blades with respect to housing 110. Therefore, a more precise determination (measurement) of the positions of the blades 150 relative to the housing 110 tends to yield a more precise and predictable drilling direction. More precise determination of the blade positions also provides for more precise borehole caliper measurements. Additionally, improving the reliability of the position sensor apparatus tends to improve the reliability of the tool (particularly the steering functionality of the tool).

Figure 3:
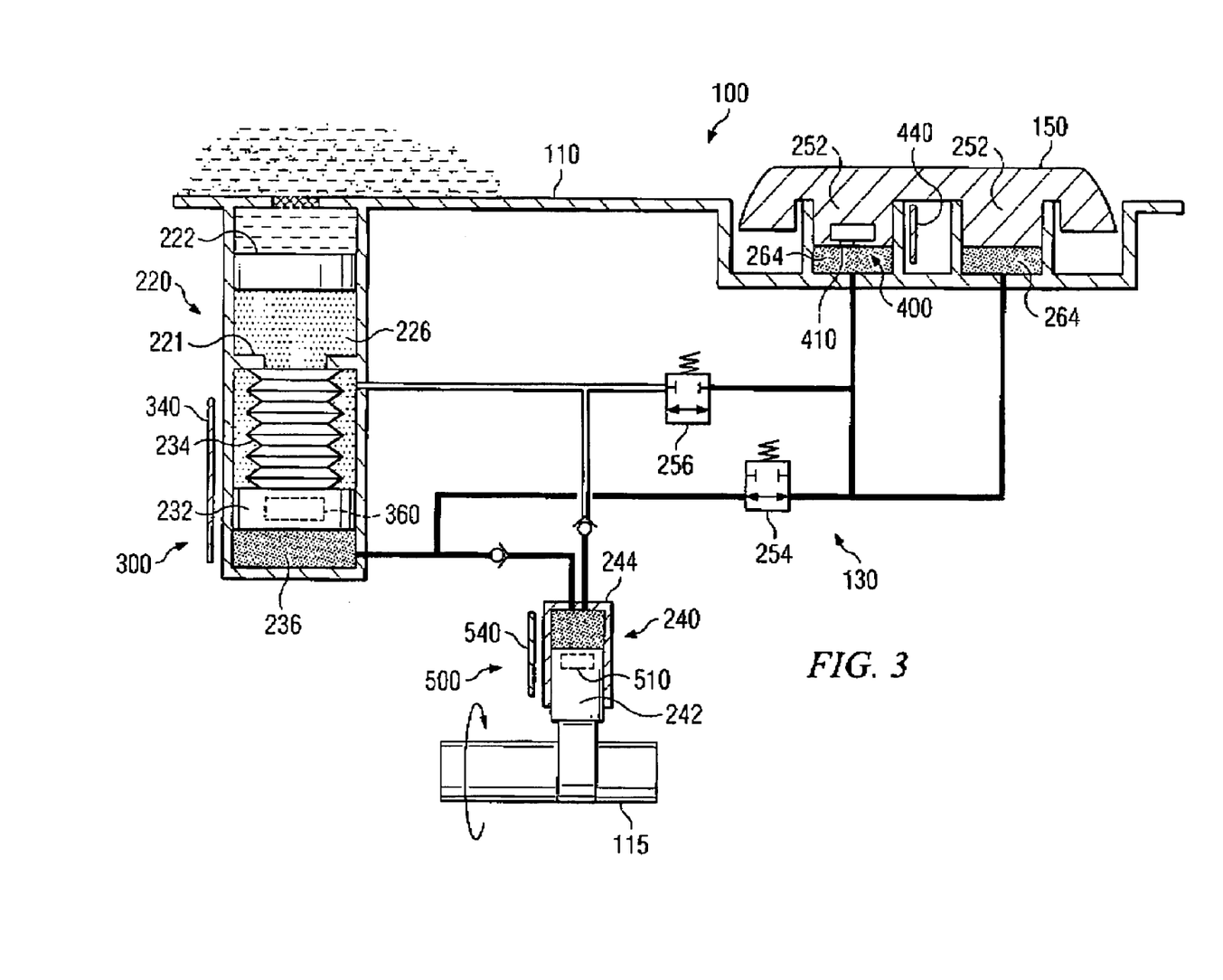
FIG. 3 depicts an exemplary hydraulic circuit in which exemplary embodiments of the present invention may be deployed.

Turning now to FIG. 3, a schematic of one exemplary hydraulic module 130 (FIG. 2) used to control blade 150 is depicted. FIG. 3 is a simplified schematic showing only a single blade. It will be understood that steering tools typically employ a plurality of blades, three being most common. Hydraulic module 130 includes a hydraulic fluid chamber 220 including first and second, low- and high-pressure reservoirs 226 and 236. In the exemplary embodiment shown, low-pressure reservoir 226 is modulated to wellbore (hydrostatic) pressure via equalizer piston 222. Hydraulic fluid in chamber 236 is pressurized by pump 240, which is energized by rotating shaft 115. In the exemplary embodiment shown, hydraulic fluid chamber 220 further includes a pressurizing spring 234 (e.g., a Belleville spring) deployed between an internal shoulder 221 of the chamber housing and a high-pressure piston 232. As the high-pressure reservoir 236 is filled by pump 240, high-pressure piston 232 compresses spring 234, which maintains the pressure in the high-pressure reservoir 236 at some predetermined pressure above wellbore pressure. Thus it will be understood that the volume of pressurized fluid in chamber 236 is related to the position of piston 232 in chamber 220.

Transmission of hydraulic pressure to blade 150 is controlled by solenoid-controlled valves 254 and 256. Opening valve 254 and closing valve 256 causes high-pressure hydraulic fluid to flow into chamber 264. As chamber 264 is filled with pressurized fluid, piston 252 is urged radially outward, which in turn urges blade 150 outward from housing 110 (e.g., into contact with the borehole wall). When the blade 150 has been extended to a desired (predetermined) position, valve 254 may be closed, thereby "locking" the blade 150 in position (at the desired extension from the tool body). In order to retract the blade (radially inward towards the tool body), valve 256 is open (while valve 254 remains closed). Opening valve 256 allows pressurized hydraulic fluid in chamber 264 to return to the low-pressure reservoir 226. Blade 150 may be urged inward (towards the tool body), for example, via spring bias and/or contact with the borehole wall. In the exemplary embodiment shown, the blade 150 is not drawn inward under the influence of a hydraulic force, although the invention is not limited in this regard.

Hydraulic module 130 further includes position sensors 300, 400, and 500 in accordance with the present invention. Position sensor 300 includes a magnet assembly 360 deployed in or on piston 232 and a substantially linear magnetic sensor array 340 deployed on chamber 220 in sensory range of magnetic flux emanating from the magnet assembly 360. Position sensor 300 is disposed to measure the position of high pressure piston 232 in chamber 220 and therefore is further disposed to measure the volume of high pressure hydraulic fluid in reservoir 236. Position sensor 400 includes magnet assembly 410 deployed in or on piston 252 (i.e., in or on blade 150) and a substantially linear magnetic sensor array 440 deployed adjacent chamber 264 in sensory range of magnetic flux emanating from magnet assembly 410. Position sensor 400 is disposed to measure the position of blade pistons 252 in chamber 264 and therefore is further disposed to measure the extension of the blade 150 relative to the housing 110 (or the tool axis). Position sensor 500 includes magnet assembly 510 deployed in or on piston 242 and a substantially linear sensor array 540 deployed adjacent pump housing 244. Position sensor 500 is disposed to measure the position of piston 242 in housing 244. Magnetic sensor arrays 340, 440, and 540 may include substantially any type of magnetic sensor, e.g., including magnetometers, reed switches, magnetoresistive sensors, and/or Hall-Effect sensors. Moreover, each sensor may have either a ratiometric (analog) or digital output. While the exemplary embodiments described below with respect to FIGS. 4A through 5 advantageously utilize Hall-Effect sensors, the invention is not limited in this regard.

Figure 4A:
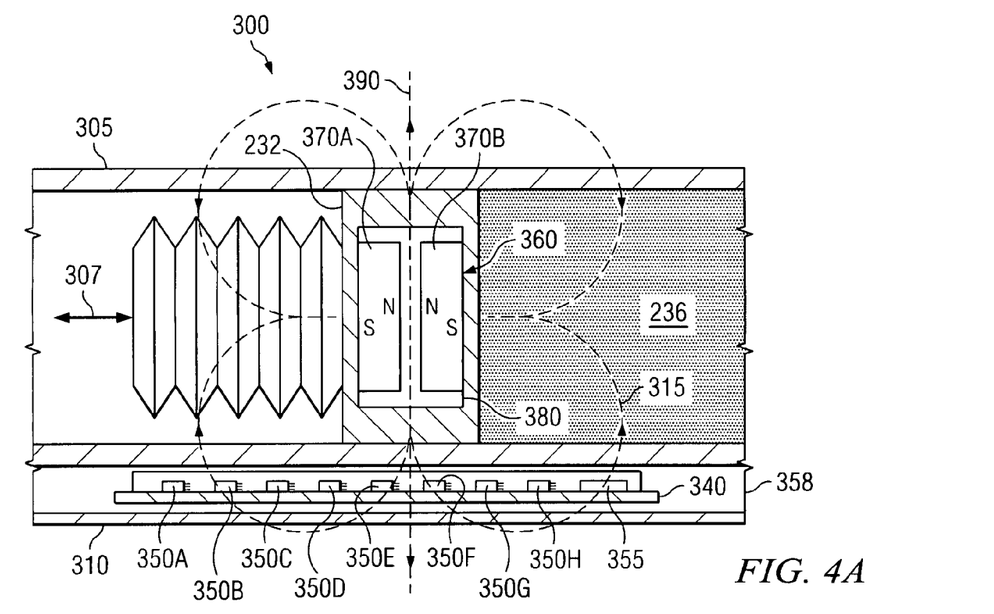
FIG. 4A depicts one exemplary embodiment of a position sensor, in accordance with the present invention, deployed on a hydraulic piston.

FIG. 4A depicts one exemplary embodiment of position sensor 300. A linear array 340 of Hall-Effect sensors 350A-H is deployed in a pressure resistant housing 310, which is located, for example, along an outer surface of hydraulic housing 305. While FIG. 4A shows an array of eight magnetic sensors, it will be appreciated by those of ordinary skill on the art that this invention may equivalently utilize substantially any suitable plurality of magnetic sensors (with five or more being preferred). In the exemplary embodiment shown, sensor array 340 further includes a microprocessor 355 electronically coupled with the sensors 350A-H. Within housing 305, magnet assembly 360 is deployed on movable piston 232. As described above, sensor array 340 is deployed in close enough proximity to magnet assembly 360 for at least one of sensors 350A-H to detect magnetic flux emanating from the magnet assembly 360. In the exemplary embodiment shown on FIG. 4A, magnet assembly 360 includes first and second magnets 370A and 370B (typically, although not necessarily, of equal size and strength) deployed in a magnetically permeable housing 380. In the exemplary embodiment shown in FIG. 4A, magnets 370A and 370B are deployed such that opposing magnetic poles face one another (e.g., the north pole on magnet 370A is adjacent to the north pole on magnet 370B). In such an embodiment, magnetic flux lines 315 emanate outward from between the magnets 370A and 370B along center plane 390.

It will be appreciated that magnet assembly 360 produces a substantially radially symmetric magnetic flux about the cylindrical axis of piston 232. While the invention is not limited in this regard, such a radially symmetric configuration advantageously provides for rotational freedom about the longitudinal axis of the piston 232. As such, the piston 232 and/or magnet assembly 360 may rotate in housing 305 during drilling (e.g., due to the extreme tool vibration commonly encountered downhole) without substantially effecting the accuracy of the linear position measurements. Moreover, a radially symmetric configuration also advantageously provides for easier tool assembly in that there is no need to key the piston 232 or magnet assembly 360 to a precise rotational position in housing 305.

As described above with respect to FIG. 3, piston 232 is disposed to move substantially linearly within housing 305 as indicated by arrows 307 (left and right as depicted in FIG. 4A.) Magnetic sensor array 340 lies substantially parallel to the direction of movement of piston 232. Moreover, each magnetic sensor 350A-H in the sensor array 340 is deployed so that its axis of sensitivity is substantially perpendicular to the array 340 (i.e., perpendicular to the direction of movement of piston 232 and parallel with center plane 390). It will be appreciated by those of ordinary skill in the art that a magnetic sensor is typically sensitive only to the component of the magnetic flux that is aligned (parallel) with the sensor's axis of sensitivity. It will also be appreciated that the exemplary embodiment of magnet assembly 340 shown on FIG. 4A results in magnetic flux lines 315 that are substantially perpendicular to the sensor array 340 where the center plane 390 intercepts the array 340. Therefore, the magnetic sensor 350A-H located closest to center plane 390 tends to sense the highest magnetic flux (magnetic field strength). For example, magnetic sensor 350E (as shown on FIG. 4A) tends to measure the highest magnetic flux because (i) it closest to magnet assembly 340 and (ii) it is closest to plane 390 (therefore the magnetic flux tends to be substantially parallel with the magnetic sensor's axis of sensitivity). It is thus possible to approximate the position of the magnet, and thus the piston, by determining which magnetic sensor 350A-H measures the greatest magnetic field.

Figure 4B:
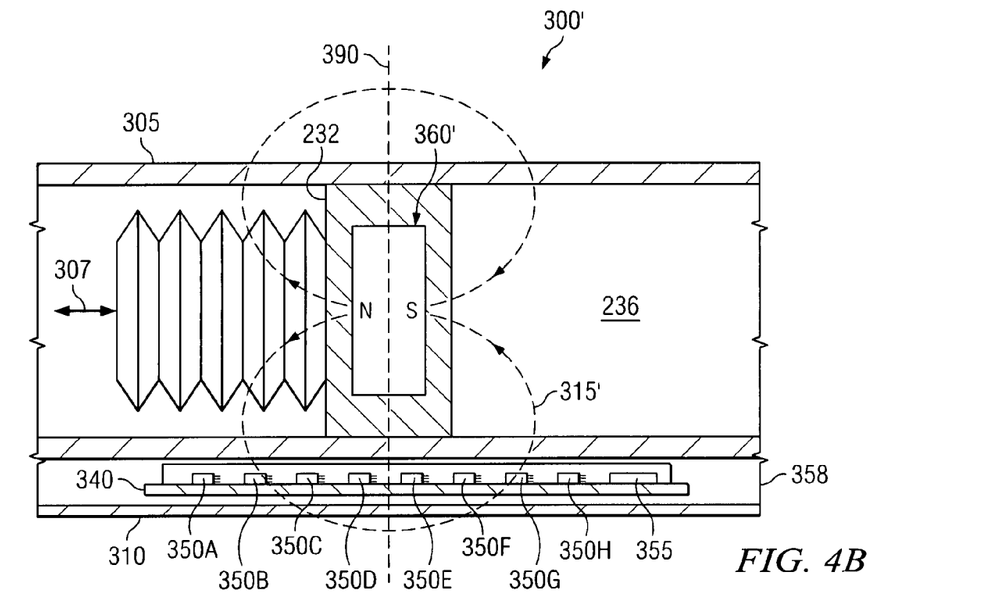
FIG. 4B depicts another exemplary embodiment of a position sensor, in accordance with the present invention, deployed on the hydraulic piston shown on FIG. 4A.

With reference now to FIG. 4B, an alternative embodiment 300' is depicted in which magnet assembly 360' includes a cylindrical magnet having a cylindrical axis substantially parallel with direction 307. Magnet assembly 360' also advantageously produces a substantially radially symmetric magnetic flux about the cylindrical axis of piston 232. As described above, sensors 350A-H are disposed so that each sensor's axis of sensitivity is substantially perpendicular to sensor array 340 (and therefore parallel with center plane 390). In this exemplary embodiment, the magnetic sensor closest to center plane 390 tends to measure the lowest magnetic flux. As shown on FIG. 4B, magnetic sensor 350E tends to sense the lowest flux despite being closer to magnet assembly 360' since the flux is nearly perpendicular to the sensor's axis of sensitivity (e.g., as shown at 315'). It is thus possible to approximate the position of the magnet, and thus the piston, by determining which magnetic sensor measures the lowest magnetic flux.

It will be appreciated that the present invention is not limited to the exemplary magnet assembly, magnet alignment, and magnetic sensor alignment combinations depicted in FIGS. 4A and 4B. Other combinations will be readily recognized by the artisan of ordinary skill. For example, referring to the exemplary embodiment shown on FIG. 4B, each sensor 350A-H in sensor array 340 may alternatively be aligned so that its axis of sensitivity is parallel with the array 340 (and therefore perpendicular to center plane 390). In such an embodiment, the position of the magnet assembly 360' would be determined based on the maximum (rather than the minimum) measured flux. Likewise, with respect to the embodiment shown on FIG. 4A, sensors 350A-H may also alternatively be aligned so that their axes of sensitivity are parallel with the array 340 (and therefore perpendicular to center plane 390). In such an embodiment, the position of the magnet assembly 360 would be determined based on the minimum (rather than the maximum) measured flux.

Figure 5:
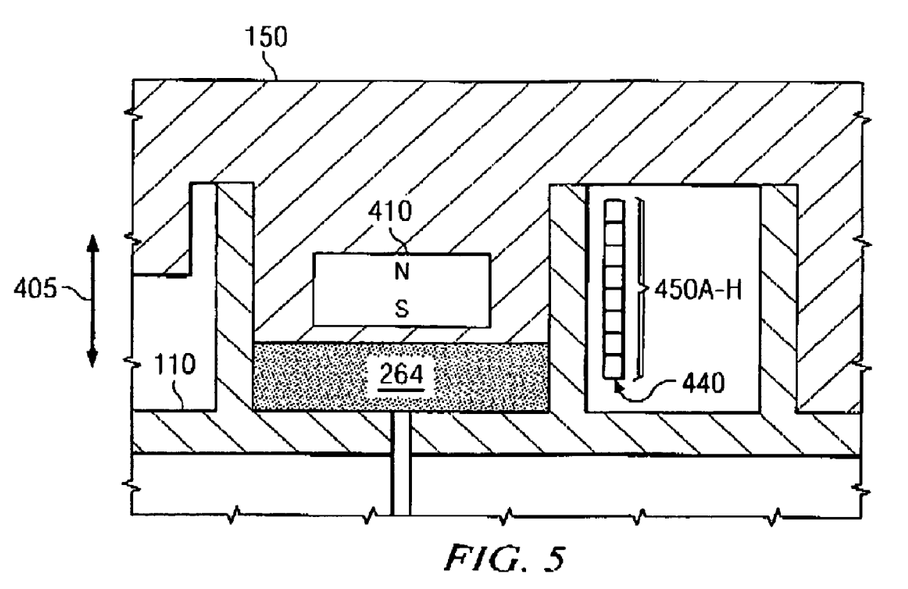
FIG. 5 depicts an exemplary embodiment of a position sensor deployed on a blade.

With reference now to FIG. 5, sensor embodiment 400 is shown in greater detail. As described above, position sensor 400 is disposed to measure the position of blade 150 (FIGS. 2 and 3). As shown on FIG. 5, blade 150 is in its fully retracted position within housing 110. In the embodiment shown, magnet assembly 410 is fixed to an inner surface of the blade 150 (inside piston 252 as shown on FIG. 3). As hydraulic fluid is pumped into chamber 264, the blade extends outward from a longitudinal axis of the tool in the direction of arrow 405. Magnetic sensor array 440 is deployed within the blade housing in close enough proximity to magnet assembly 410 such that at least one of the sensors 450A-H on sensor array 440 is in sensory range of magnetic flux emanating from the assembly 410. In the exemplary embodiment shown on FIG. 5, magnet assembly 410 is substantially similar to magnet assembly 360', although an assembly similar to magnet assembly 360 may also be equivalently utilized. Sensors 450A-H may be deployed having substantially any suitable alignment (e.g., parallel or perpendicular to array 440). The typical range of motion of a blade in a rotary steerable tool (e.g., tool 100) is approximately one inch. Thus, in rotary steerable embodiments sensors 450A-H are preferably closely spaced (e.g., spaced at an interval of approximately ⅛ inch or less along the length of the array 440). However the invention is not limited in this regard.

While FIG. 5 depicts an exemplary embodiment in which the magnet assembly 410 is deployed in the blade 150 (e.g., in piston 252) and the array 440 of sensors 450A-H is deployed on the housing 110, the invention is expressly not limited in this regard. It will be understood that sensor 400 may be equivalently configured such that magnet assembly 410 is deployed on housing 110 and sensor array 440 is deployed in the blade 150.

Figure 6:
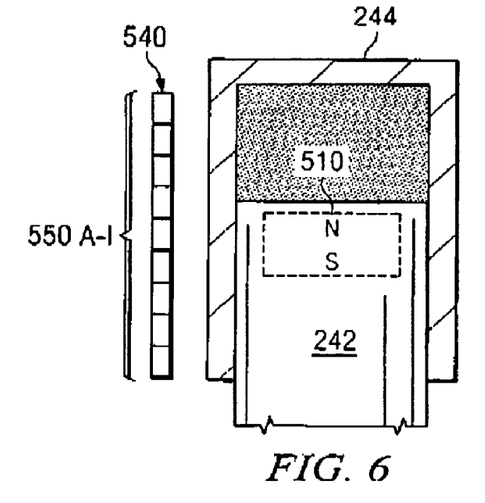
FIG. 6 depicts an exemplary embodiment of a position sensor deployed on a pump.

Turning now to FIG. 6, sensor embodiment 500 is shown in greater detail. Position sensor 500 is disposed to measure the axial position of piston 242 in housing 244. As shown on FIGS. 3 and 6, rotation of shaft 115 causes piston 242 to reciprocate in housing 244 (e.g., due to a cam on the shaft). Magnetic sensor array 540 is deployed on an outer surface of housing 244 in close enough proximity to magnet assembly 510 such that at least one of the sensors 550A-I is in sensory range of magnetic flux emanating from the assembly 510. In the exemplary embodiment shown on FIG. 6, magnet assembly 510 is substantially similar to magnet assembly 360', although an assembly similar to magnet assembly 360 may also be equivalently utilized. Sensors 550A-I may be deployed having substantially any suitable alignment (e.g., parallel or perpendicular to array 540).

With continued reference to FIGS. 3 and 6, it will be appreciated that sensor embodiment 500 is disposed to measure several tool parameters. For example, the stroke volume of pump 240 (the volume of fluid pumped per single rotation of shaft 115 in housing 110) may be determined in substantially real time during drilling by measuring the axial positions at the top and bottom of the piston stroke. Additionally, the axial position of piston 242 in housing 244 indicates the rotational position of the shaft 115 relative to the housing 110. The rotation rate of the shaft 115 with respect to the housing 110 may further be determined from the periodic motion of piston 242 in housing 244. While such rotational position and rotation rate measurements are typically made using other sensor arrangements, it will be appreciated that sensor embodiment 500 advantageously provides for a redundant measure of these parameters. As is known to those of ordinary skill in the downhole arts, redundant measurement capabilities can be highly advantageous in demanding downhole environments in which sensor failures are not uncommon.

It will be appreciated that downhole tools must typically be designed to withstand shock levels in the range of 1000 G on each axis and vibration levels of 50 G root mean square. Moreover, downhole tools are also typically subject to pressures ranging up to about 25,000 psi and temperatures ranging up to about 200 degrees C. With reference again to FIGS. 4A and 4B, sensor array 340 is shown deployed in a pressure resistant housing 310. Such an arrangement is preferred for downhole applications utilizing solid state magnetic field sensors such as Hall-Effect sensors and magnetoresistive sensors. While not shown on FIGS. 5 and 6, sensor arrays 440 and 540 are also preferably deployed in corresponding pressure resistant housings. In the exemplary embodiment shown, housing 310 includes a sealed, magnetically permeable, steel tube that is configured to resist downhole pressures which can damage sensitive electronic components. The sensor arrays (340, 440, and 540) are also typically encapsulated in a potting material 358 to improve resistance to shocks and vibrations. Magnetic assemblies 360, 360', 410, and 510 are also typically constructed in view of demanding downhole conditions. For example, suitable magnets must posses a sufficiently high Curie Temperature to prevent demagnetization at downhole temperatures. Samarium cobalt (SaCo$_5$) magnets are typically preferred in view of their high Curie Temperatures (e.g., from about 700 to 800 degrees C.). Moreover, magnet assemblies 360, 360', 410, and 510 are also typically (although not necessarily) deployed inside corresponding pistons 232, 252, and 242 in order to provide additional shock and vibration resistance.

In each of the exemplary embodiments shown on FIGS. 4A, 4B, 5, and 6, the output of each magnetic sensor may be advantageously electronically coupled to the input of a microprocessor. The microprocessor serves to process the data received by the sensor array. Substantially any suitable microprocessor, logic gate, or hardware device able to execute logic may be utilized. Moreover, a hybrid device including multiple magnetic sensors (e.g., Hall-Effect sensors) and a microprocessor in a single package may also be utilized. The invention is not limited in these regards.

In preferred embodiments, a suitable microprocessor (such as a PIC16F630/676 Microcontroller available from Microchip) is embedded within the sensor array. For example, as shown on FIGS. 4A and 4B, a suitable microprocessor 355 is deployed on a printed circuit board with sensors 350A-H. In such an embodiment, the microprocessor output (rather than the signals from the individual magnetic sensors) is typically electronically coupled with a main processor which is deployed further away from the sensor array (e.g., deployed in control module 140 as shown on FIG. 2). This configuration advantageously reduces wiring requirements in the body of the downhole tool, which is particularly important in smaller diameter tool embodiments (e.g., tools having a diameter of less than about 12 inches). Digital output from the embedded microprocessor also tends to advantageously reduce electrical interference in wiring to the main processor. Embedded microprocessor output may also be combined with a voltage source line to further reduce the number of wires required, e.g., one wire for combined power and data output and one wire for ground. This may be accomplished, for example, by imparting a high frequency digital signal to the voltage source line or by modulating the current draw from the voltage source line. Such techniques are known to those of ordinary skill in the art.

In preferred embodiments of this invention, microprocessor 355 (FIGS. 4A and 4B) includes processor-readable or computer-readable program code embodying logic, including instructions for calculating a precise linear position of an element, such as a piston or a blade, from the received magnetic sensor measurements. While substantially any logic routines may be utilized, it will be appreciated that logic routines requiring minimal processing power are advantageous for downhole applications (particularly for LWD, MWD, and directional drilling embodiments of the invention in which both electrical and electronic processing power are often severely limited).

Figure 7A:
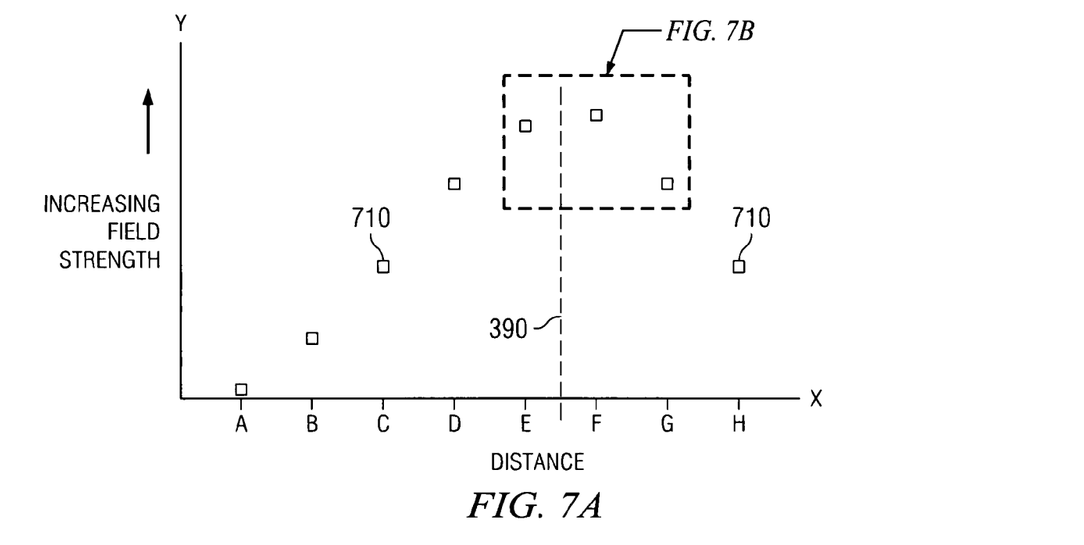
FIG. 7A depicts a graph of magnetic field strength versus distance for an exemplary data set measured by the sensor arrangement depicted on FIG. 4A.
Figure 7B:
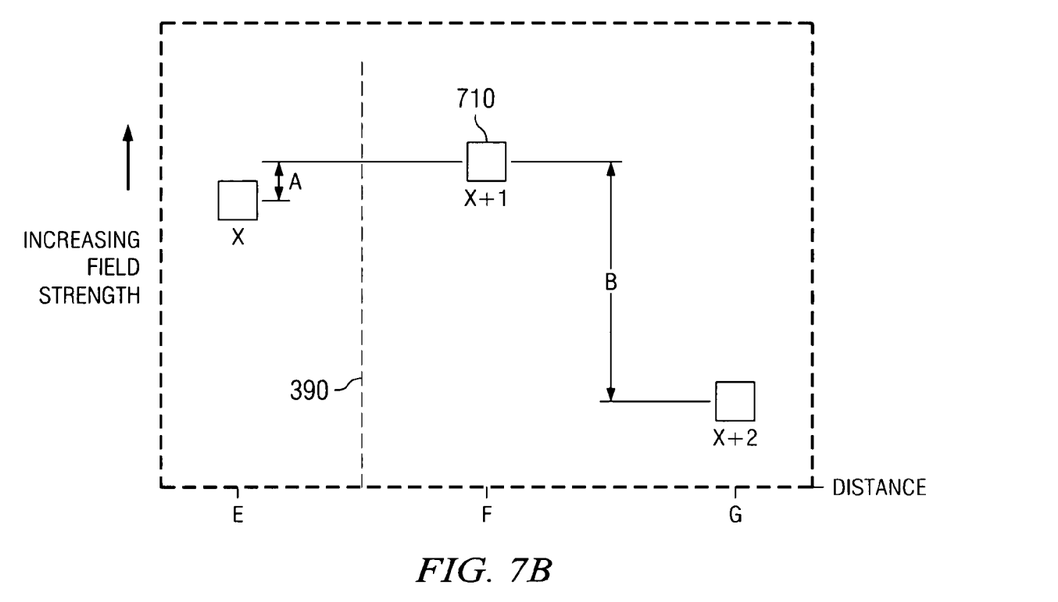
FIG. 7B depicts a portion of the graph shown on FIG. 7A about the maximum.

Turning now to FIGS. 7A and 7B, a graphical representation of one exemplary mathematical technique for determining the linear position is illustrated. The exemplary method embodiment described with respect to FIGS. 7A and 7B determines the linear position via locating the position of a maximum magnetic field in the array 340. FIG. 7A plots the magnetic field measurements made at each of sensors 350A-H as a function of distance along array 340. Data points 710 represent the absolute value of the magnetic field strength as measured by the magnetic sensors 350A-H. Note that in the exemplary embodiment shown, the maximum magnetic field strength (and therefore the position of plane 390) is located between sensors 350E and 350F. In one exemplary embodiment, the position of plane 390 (and therefore the position of piston 232) may be determined as follows. Processor 355 first selects the three consecutive highest magnetic field measurements made by sensors 350A-H (e.g., as measured by sensors 350E, 350F, and 350G in the exemplary embodiment shown on FIG. 7A). These three consecutive measurements are illustrated in more detail in FIG. 7B. The location of the maximum may then be determined mathematically from the three consecutive magnetic field measurements, for example, as follows:

$$P = L\left(\frac{2x+1}{2} + \frac{A}{A+B}\right) \qquad \text{Equation 1}$$

where P represents the linear position of plane 390 in the array, L represents the distance interval between adjacent sensors in the array, A represents the difference in the absolute value of the magnetic field between the first and second of the three consecutive data points, B represents the difference in the absolute value of the magnetic field between the second and third of the three consecutive data points (A and B are shown on FIG. 7B), and x is a counting variable having an integer value representing the particular sensor used to measure the first of the three consecutive data points shown on FIG. 7B (such that x=1 for sensor 350A, x=2 for sensor 350B, x=3 for sensor 350C, and so on). In the exemplary embodiment shown, x=5 (sensor 350E).

Figure 8A:
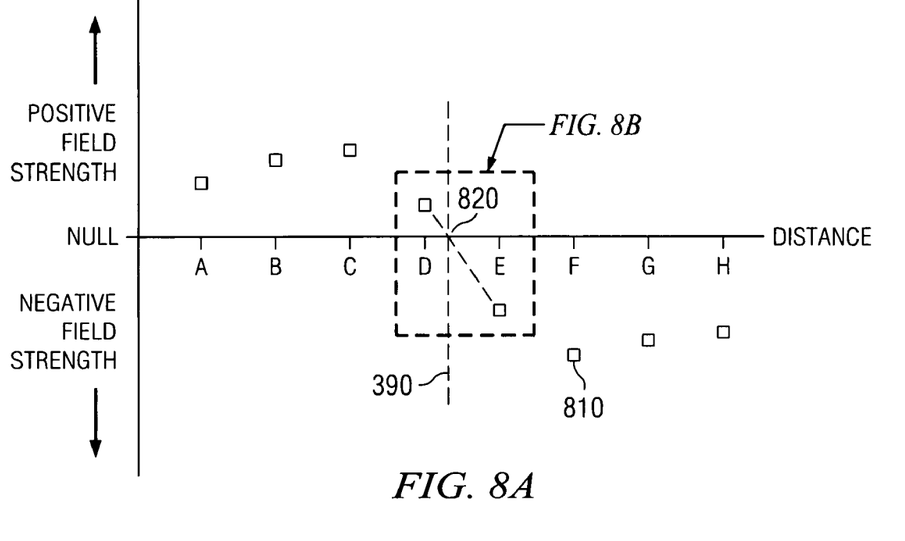
FIG. 8A depicts a graph of magnetic field strength versus distance for an exemplary data set measured by the sensor arrangement depicted on FIG. 4B.
Figure 8B:
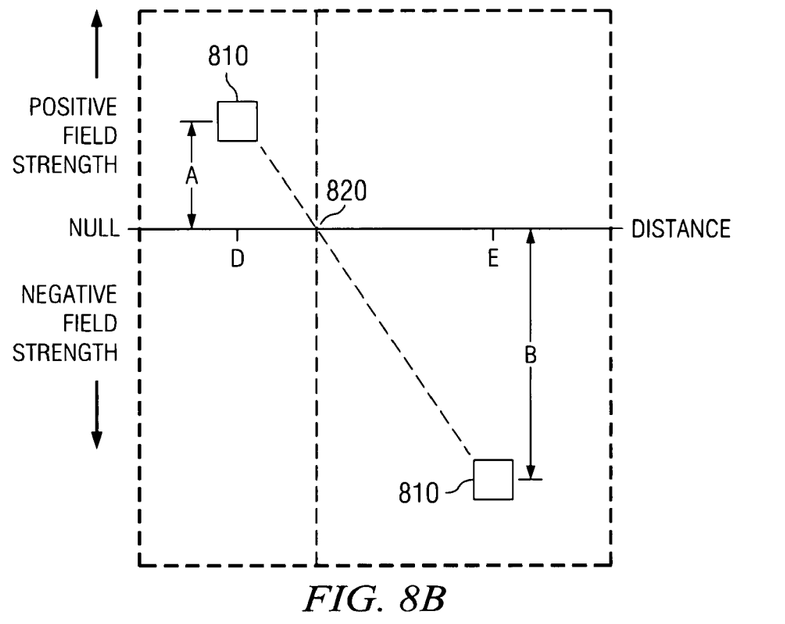
FIG. 8B depicts a portion of the graph shown on FIG. 8A about the zero-crossing.

With reference now to FIGS. 8A and 8B, a graphical representation of another exemplary mathematical technique for determining the linear position is illustrated. Data points 810 represent the magnetic field strength as measured by sensors 350A-H on FIG. 4B. In this embodiment, the position of center plane 390 is indicated by zero-crossing 820, the location on the array at which magnetic flux is substantially null and at which the polarity of the magnetic field changes from positive to negative (or negative to positive). Note that in the exemplary embodiment shown, the position of the zero crossing (and therefore the position of plane 390) is located between sensors 350D and 350E. In the exemplary embodiment shown on FIG. 8B, processor 355 first selects adjacent sensors (e.g., sensors 350D and 350E) between which the sign of the magnetic field changes (from positive to negative or negative to positive). The position of the zero crossing 820 may then be determined, for example, by fitting a straight line through the data points on either side of the zero crossing (e.g., between the measurements made by sensors 350D and 350E in embodiment shown on FIG. 8B). It will be appreciated that the shape and strength of the magnet(s) may be advantageously configured, for example, to produce a highly linear flux regime in the vicinity of the zero-crossing. The location of the zero crossing 820 may then be determined mathematically from the magnetic field measurements, for example, as follows:

$$P = L\left(x + \frac{A}{A+B}\right) \quad \text{Equation 2}$$

where P represents the linear position of plane 390, L represents the distance interval between adjacent sensors in the array, A and B represent the absolute values of the magnetic field measured on either side of the zero crossing (A and B are shown on FIG. 7B), and x is a counting variable having an integer value representing the first of the two adjacent sensors positioned on either side of the zero crossing 820 on FIG. 7B (such that x=1 for sensor 350A, x=2 for sensor 350B, x=3 for sensor 350C, and so on). In the exemplary embodiment shown, x=4 (sensor 350D).

It will be appreciated that position sensing methods described above with respect to FIGS. 7A through 8B advantageously require minimal computational resources (minimal processing power), which is critical in downhole applications in which 8-bit microprocessors are commonly used. These methods also provide accurate position determination along the full length of the sensor array. For example, an accurate position may be determined even when the magnetic field maximum or zero crossing are located near the ends of the array (near the first or last sensor in the array). The zero crossing method (e.g., as shown on FIGS. 8A and 8B) tends to be further advantageous in that a wider sensor input range is available (from the negative to positive saturation limits of the sensors). Even if one or more of the sensors saturate, position determination is typically unaffected since the sensors on either side of the zero crossing are subject to a relatively low magnetic field strength as compared to those sensors further away from the zero crossing. Moreover, the computed position tends to be less sensitive to the distance between the magnet(s) and the array (since the method locates a zero crossing rather than a magnetic field maximum).

While the above described exemplary embodiments pertain to steering tool embodiments including hydraulically actuated blades, it will be understood that the invention is not limited in this regard. The artisan of ordinary skill will readily recognize other downhole uses of position sensors in accordance with the present invention. For example, position sensors in accordance with this invention may be utilized to measure the extension of caliper probes used in wireline applications (one such caliper probe is disclosed in U.S. Pat. No. 6,339,886). Additionally, position sensors in accordance with this invention may also be utilized to measure hydraulic volume in an inflatable packer assembly, such as are commonly utilized in MWD, LWD, and wireline applications (one such packer assembly is disclosed in U.S. Pat. No. 5,517,854).

Although the present invention and its advantages have been described in detail, it should be understood that various changes, substitutions and alternations may be made herein without departing from the spirit and scope of the invention as defined by the appended claims.

I claim:

1. A downhole tool comprising:
a downhole tool body;
first and second members disposed to translate substantially linearly with respect to one another;
at least one magnet deployed on the first member;
at least three magnetic field sensors deployed in a linear array on a circuit board, the circuit board deployed on the second member, the magnetic field sensors spaced in a direction substantially parallel with a direction of translation between the first and second members, at least three of the magnetic field sensors in sensory range of magnetic flux emanating from the magnet; and
a controller deployed on the circuit board along with the magnetic field sensors, the controller disposed to determine a linear position of the first and second members with respect to one another from magnetic flux measurements at the magnetic field sensors.

2. The downhole tool of claim 1, wherein the downhole tool is selected from the group consisting of wireline tools, measurement while drilling tools, logging while drilling tools, directional drilling tools, and rotary steerable tools.

3. The downhole tool of claim 1, wherein the magnet comprises a cylindrical magnet having a cylindrical axis substantially parallel with the direction of translation.

4. The downhole tool of claim 1, wherein the magnet comprises first and second cylindrical magnets having cylindrical axes substantially parallel with the direction of translation, the first and second magnets deployed such that a magnetic pole on the first magnet is adjacent an opposing magnetic pole on the second magnet.

5. The downhole tool of claim 1, wherein the magnetic field sensors are deployed such that an axis of sensitivity of each of the sensors is substantially parallel with the direction of translation.

6. The downhole tool of claim 1, wherein the magnetic field sensors are deployed such that an axis of sensitivity of each of the sensors is substantially perpendicular to the direction of translation.

7. The downhole tool of claim 1, wherein the magnetic field sensors are selected from the group consisting of Hall-Effect sensors, magnetoresistive sensors, magnetometers, and reed switches.

8. A downhole steering tool configured to operate in a borehole, the steering tool comprising:
at least one blade deployed in a housing, the blade configured to displace between radially opposed retracted and extended positions in the housing;
a position sensor disposed to measure the position of the blade relative to the housing, the position sensor including a magnet assembly deployed on either the blade or the housing and a linear array of magnetic field sensors deployed on either the blade or the housing such that the linear array is substantially parallel with a direction of extension and retraction of the blade, the magnet assembly and linear array disposed to translate with respect to one another as the blade is retracted and extended in the housing, the linear array including at least three magnetic field sensors deployed along a line on a circuit board, at least three of the magnetic field sensors in sensory range of magnetic flux emanating from the magnet assembly, and
a controller deployed on the circuit board along with the magnetic field sensors, the controller disposed to determine an extension of the blade from magnetic flux measurements made by the magnetic field sensors.

9. The steering tool of claim 8, wherein the magnet assembly is deployed on the housing and the linear array is deployed on the blade.

10. The steering tool of claim 8, wherein the magnet assembly is deployed on the blade and the linear array is deployed in a sealed, pressure resistant housing which is fixed to said blade housing.

11. The steering tool of claim 8, wherein the magnetic field sensors are deployed on the array such that an axis of sensitivity of each of the sensors is substantially parallel with the direction of extension and retraction of the blade.

12. The steering tool of claim 8, wherein the magnetic field sensors are deployed on the array such that an axis of sensitivity of each of the sensors is substantially perpendicular to the direction of extension and retraction of the blade.

13. The steering tool of claim 8, wherein the magnet assembly comprises a cylindrical magnet having a cylindrical axis substantially parallel with the direction of extension and retraction of the blade.

14. The steering tool of claim 8, wherein the magnet assembly comprises first and second cylindrical magnets having cylindrical axes substantially parallel with the direction of extension and retraction of the blade, the first and second magnets deployed such that a magnetic pole on the first magnet is adjacent an opposing magnetic pole on the second magnet.

15. The steering tool of claim 8, wherein the controller is configured to determine the extension of the blade by determining at least one member of the group consisting of (i) a location in the linear array of a magnetic flux maximum and (ii) a location in the linear array of a magnetic flux null.

16. The steering tool of claim 15, wherein the controller is configured to locate the magnetic flux maximum by (i) selecting magnetic flux measurements made at three consecutive magnetic field sensors along the linear array and (ii) processing the three magnetic flux measurements according to the equation:

$$P = L\left(\frac{2x+1}{2} + \frac{A}{A+B}\right)$$

wherein P represents the location of the magnetic flux maximum, L represents a distance interval between adjacent sensors in the linear array, A represents a difference in an absolute value of the magnetic flux between a first and a second of the three magnetic flux measurements, B represents a difference in an absolute value of the magnetic flux between the second and a third of the three magnetic flux measurements, and x represents a counting variable having an integer value representing the magnetic field sensor used to measure the first of the three magnetic flux measurements.

17. The steering tool of claim 15, wherein the controller determines the location of the magnetic flux null by (i) selecting first and second magnetic flux measurements made at adjacent magnetic field sensors having a magnetic flux null located therebetween and (ii) processing the first and second magnetic flux measurements according to the equation:

$$P = L\left(x + \frac{A}{A+B}\right)$$

wherein P represents the location of the magnetic flux null, L represents a distance interval between adjacent sensors in the linear array, A and B represent the absolute values of the first and second magnetic flux measurements, and x represents a counting variable having an integer value representing the magnetic field sensor used to measure the first magnetic flux measurement.

18. The steering tool of claim 8, wherein the magnetic sensors are selected from the group consisting of magnetoresistive sensors and Hall-Effect sensors.

19. A downhole tool comprising:
a downhole tool body;
a hydraulic fluid chamber deployed in the tool body and disposed to provide pressurized hydraulic fluid to at least one hydraulically actuated tool member, the hydraulic fluid chamber including a piston deployed in the chamber;
a position sensor disposed to measure a position of the piston in the chamber, the position sensor including a magnet assembly deployed on the piston and a linear array of magnetic field sensors deployed on the tool body such that the linear array is substantially parallel with a direction of motion of the piston in the chamber, the linear array including at least three magnetic field sensors deployed along a line on a circuit board, at least three of the magnetic field sensors in sensory range of magnetic flux emanating from the magnet assembly, and
a controller deployed on the circuit board along with the magnetic field sensors, the controller disposed to determine a fluid volume of the hydraulic chamber from magnetic flux measurements made by the magnetic field sensors.

20. The downhole tool of claim 19, wherein the magnetic field sensors are deployed on the array such that an axis of sensitivity of each of the sensors is substantially parallel with the direction of motion of the piston.

21. The downhole tool of claim 19, wherein the magnetic field sensors are deployed on the array such that an axis of sensitivity of each of the sensors is substantially perpendicular to the direction of motion of the piston.

22. The downhole tool of claim 19, wherein the magnet assembly produces a substantially radially symmetric flux about the piston.

23. The downhole tool of claim 19, wherein the magnet assembly comprises a cylindrical magnet having a cylindrical axis substantially parallel with the direction of motion of the piston.

24. The downhole tool of claim 19, wherein the magnetic comprises first and second cylindrical magnets having cylindrical axes substantially parallel with the direction of motion of the piston, the first and second magnets deployed such that a magnetic pole on the first magnet is adjacent an opposing magnetic pole on the second magnet.

25. The steering tool of claim 19, wherein the controller is configured to determine the fluid volume of the hydraulic chamber by determining at least one member of the group consisting of (i) a location in the linear array of a magnetic flux maximum and (ii) a location in the linear array of a magnetic flux null.

26. The steering tool of claim 25, wherein the controller is configured to locate the magnetic flux maximum by (i) selecting magnetic flux measurements made at three consecutive magnetic field sensors along the linear array and (ii) processing the three magnetic flux measurements according to the equation:

$$P = L\left(\frac{2x+1}{2} + \frac{A}{A+B}\right)$$

wherein P represents the location of the magnetic flux maximum, L represents a distance interval between adjacent sensors in the linear array, A represents a difference in an absolute value of the magnetic flux between a first and a second of the three magnetic flux measurements, B represents a difference in an absolute value of the magnetic flux between the second and a third of the three magnetic flux measurements, and x represents a counting variable having an integer value representing the magnetic field sensor used to measure the first of the three magnetic flux measurements.

27. The steering tool of claim 25, wherein the controller determines the location of the magnetic flux null by (i) selecting first and second magnetic flux measurements made at adjacent magnetic field sensors having a magnetic flux null located therebetween and (ii) processing the first and second magnetic flux measurements according to the equation:

$$P = L\left(x + \frac{A}{A+B}\right)$$

wherein P represents the location of the magnetic flux null, L represents a distance interval between adjacent sensors in the linear array, A and B represent the absolute values of the first and second magnetic flux measurements, and x represents a counting variable having an integer value representing the magnetic field sensor used to measure the first magnetic flux measurement.

28. The downhole tool of claim 19, wherein:
the hydraulic fluid chamber comprises a piston pump, the piston actuated by a rotating shaft disposed to rotate with respect to the tool body; and
the tool further comprises a controller, the controller disposed to determine at least one of (i) a stroke volume of the pump, (ii) a rotation rate of the shaft with respect to the housing, and (iii) a rotational position of the shaft with respect to the house from magnetic flux measurements made by the magnetic field sensors in the linear array.

29. The downhole tool of claim 19, wherein the magnetic sensors are selected from the group consisting of magnetoresistive sensors and Hall-Effect sensors.

30. A directional drilling tool comprising:
a plurality of blades deployed in a housing, the blades configured to displace between radially opposed retracted and extended positions;
a hydraulic module deployed in the housing and disposed to extend the blades, the hydraulic module including a pressurized fluid chamber having a spring loaded piston;
each of the blades including a position sensor disposed to measure the position of a corresponding blade relative to the housing, each position sensor including a first magnet assembly deployed on either the corresponding blade or the housing and a first linear array of magnetic field sensors deployed on either the corresponding blade or the housing such that the first linear array is substantially parallel with a direction of extension and retraction of the blade, each of the first linear arrays including (i) at least three magnetic field sensors deployed along a line on a corresponding first circuit board and (ii) a first controller deployed on the first circuit board, the first controller disposed to determine an extension of the blade from magnetic flux measurements made by the magnetic field sensors in the first linear array, the magnet assembly and the first linear array disposed to translate with respect to one another as the blade is retracted and extended in the housing; and
a volume sensor disposed to measure a fluid volume of the pressurized fluid chamber, the volume sensor including a second magnet assembly deployed on the piston and a second linear array of magnetic field sensors deployed on the housing such that the second linear array is substantially parallel with a direction of motion of the piston in the pressurized fluid chamber, the second linear array including (i) at least three magnetic field sensors deployed along a line on a second circuit board and (ii) a second controller deployed on the second circuit board, the second controller disposed to determine a fluid volume of the pressurized fluid chamber from magnetic flux measurements made by the magnetic field sensors in the second linear array.

31. The directional drilling tool of claim 30, wherein the housing is disposed about a shaft, the shaft disposed to rotate relative to the housing.

32. The directional drilling tool of claim 30, wherein the controllers are configured to determine the corresponding blade extensions and the fluid volume by determining locations of magnetic flux nulls in the corresponding first and second linear arrays.

33. The directional drilling tool of claim 32, wherein the controller determines the location of each of the magnetic flux nulls by (i) selecting first and second magnetic flux measurements made at adjacent magnetic field sensors having a magnetic flux null located therebetween and (ii) processing the first and second magnetic flux measurements according to the equation:

$$P = L\left(x + \frac{A}{A+B}\right)$$

wherein P represents the location of the magnetic flux null, L represents a distance interval between adjacent sensors in the corresponding linear array, A and B represent the absolute values of the first and second magnetic flux measurements, and x represents a counting variable having an integer value representing the magnetic field sensor used to measure the first magnetic flux measurement.

34. A method for determining a relative linear position between first and second members of a downhole tool, the method comprising:
(a) deploying a downhole tool in a borehole, the downhole tool including first and second members disposed to translate linearly with respect to one another, at least one magnet deployed on the first member, and a linear array of magnetic field sensors deployed on the second member such that the linear array is substantially parallel with a direction of translation between the first and second members, the linear array including at least three magnetic field sensors deployed along a line on a circuit board, the linear array further including a controller deployed on the circuit board;
(b) causing each of the magnetic field sensors to measure a magnetic flux; and
(c) locally processing the magnetic flux measurements with the controller to determine the relative linear position between the first and second members.

35. The method of claim 34, wherein (c) further comprises determining at least one member of the group consisting of (i) a location in the linear array of a magnetic flux maximum and (ii) a location in the linear array of a magnetic flux null.

36. The method of claim 35, wherein determining the location of the magnetic flux maximum in (c) further comprises:
(i) selecting magnetic flux measurements made at three consecutive magnetic field sensors along the linear array; and
(ii) processing the three magnetic flux measurements according to the equation:

$$P = L\left(\frac{2x+1}{2} + \frac{A}{A+B}\right)$$

wherein P represents the location of the magnetic flux maximum, L represents a distance interval between adjacent sensors in the linear array, A represents a difference in an absolute value of the magnetic flux between a first and a second of the three magnetic flux measurements, B represents a difference in an absolute value of the magnetic flux between the second and a third of the three magnetic flux measurements, and x represents a counting variable having an integer value representing the magnetic field sensor used to measure the first of the three magnetic flux measurements.

37. The method of claim 35, wherein determining the location of the magnetic flux null in (c) further comprises:
(i) selecting first and second magnetic flux measurements made at adjacent magnetic field sensors having a magnetic flux null located therebetween; and
(ii) processing the first and second magnetic flux measurements according to the equation:

$$P = L\left(x + \frac{A}{A+B}\right)$$

wherein P represents the location of the magnetic flux null, L represents a distance interval between adjacent sensors in the linear array, A and B represent the absolute values of the first and second magnetic flux measurements, and x represents a counting variable having an integer value representing the magnetic field sensor used to measure the first magnetic flux measurement.

38. The downhole tool of claim 1, wherein the circuit board is deployed in a sealed, pressure resistant housing.

39. The downhole tool of claim 19, wherein the circuit board is deployed in a sealed, pressure resistant housing.

40. The downhole tool of claim 30, wherein the first and second circuit boards are deployed in corresponding sealed, pressure resistant housings.

* * * * *